(12) United States Patent
Saidan et al.

(10) Patent No.: US 7,525,085 B2
(45) Date of Patent: Apr. 28, 2009

(54) MULTI-AXIS OPTICAL ENCODERS (75) Inventors: Saiful Bahari Saidan, Bayan Lepas (MY); Theng Hooi Yeoh, Penang (MY); Chiang Sun Cheah, Butterworth (MY); Jiin Cheang Cheong, Bayan Baru (MY); Chin Heong Yeoh, Bukit Mertajam (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 11/403,999

(22) Filed: Apr. 14, 2006

(65) Prior Publication Data

US 2007/0241270 A1   Oct. 18, 2007

(51) Int. Cl.
 *G01D 5/34* (2006.01)
(52) U.S. Cl. .................................. 250/231.13
(58) Field of Classification Search .......... 250/231.13–231.19; 356/614–620; 33/1 PT
See application file for complete search history.

(56) References Cited

U.S. PATENT DOCUMENTS

| | | | | |
|---|---|---|---|---|
| 4,572,952 A * | 2/1986 | March | ................... | 250/237 G |
| 5,317,149 A * | 5/1994 | Uebbing et al. | ........ | 250/231.14 |
| 6,564,168 B1 * | 5/2003 | Hasser | ...................... | 702/163 |
| 6,664,535 B1 * | 12/2003 | Nahum et al. | .......... | 250/231.14 |
| 7,060,968 B1 * | 6/2006 | Leviton | ................. | 250/231.13 |
| 7,309,855 B2 * | 12/2007 | Nagasaka et al. | ...... | 250/231.14 |
| 2003/0193016 A1 * | 10/2003 | Chin et al. | ............. | 250/231.13 |
| 2005/0072912 A1 * | 4/2005 | Mizuno et al. | ......... | 250/231.14 |
| 2006/0243895 A1 * | 11/2006 | Nordenfelt et al. | ..... | 250/231.13 |

* cited by examiner

*Primary Examiner*—Thanh X Luu (57) ABSTRACT

An optical encoding apparatus for the detection of position and/or motion of a mechanical device includes a codescale, an encoder housing having one or more portions and a light-detecting sensor embedded within the encoder housing, wherein the light-detecting sensor is capable of sensing a pattern produced by the codescale superimposed on the light-detecting sensor, and wherein the light-detecting sensor includes a two-dimensional array of light detection elements having dimensions n-by-m where n and m are both integers greater than 4.

18 Claims, 9 Drawing Sheets

MULTI-AXIS OPTICAL ENCODERS

BACKGROUND

The present disclosure relates to an optical encoding device for the sensing of position and/or motion.

Optical encoders are used in a wide variety of contexts to determine position and/or movement of an object with respect to some reference. Optical encoding is often used in mechanical systems as an inexpensive and reliable way to measure and track motion among moving components. For instance, printers, scanners, photocopiers, fax machines, plotters, and other imaging systems often use optical encoders to track the movement of an image media, such as paper, as an image is printed on the media or an image is scanned from the media.

Generally, an optical encoder includes some form of light emitter/detector pair working in tandem with a "codewheel" or a "codestrip". Codewheels are generally circular and can be used for detecting rotational motion, such as the motion of a paper feeder drum in a printer or a copy machine. In contrast, codestrips generally take a linear form and can be used for detecting linear motion, such as the position and velocity of a print head of the printer. Such codewheels and codestrips generally incorporate a regular pattern of slots and bars depending on the form of optical encoder.

While optical encoders have proved to be a reliable technology, there still exists substantial industry pressure to simplify manufacturing operations, reduce the number of manufacturing processes, minimize the number of parts and minimize the operational space. Accordingly, new technology related to optical encoders is desirable.

SUMMARY

In the following embodiments, the novel systems and apparatus of the present disclosure eliminate the need for a codewheel/codestrip. By incorporating linear optics into an encoder's emitter and detector, then applying some intelligent post-processing, it is possible to create a reliable optical encoder without a codewheel/codestrip.

In a first sense, an optical encoding apparatus for the detection of position and/or motion of a mechanical device includes a codescale, an encoder housing having one or more portions, and a light-detecting sensor embedded within the encoder housing, wherein the light-detecting sensor is capable of sensing a pattern produced by the codescale and superimposed on the light-detecting sensor, and wherein the light-detecting sensor includes a two-dimensional array of light detection elements having dimensions n-by-m where n and m are both integers greater than 4.

In a second sense, an optical encoding apparatus for the detection of position and/or motion of a mechanical device includes a codescale, an encoder housing having one or more portions, a light-detecting means embedded within the encoder housing for sensing a pattern produced by the codescale; and a processing means linked to the light-detecting means for compensating for an alignment error of the codescale with respect to the encoder housing and for determining a movement of the codescale with respect to the encoder housing.

In a third sense, a method for calibrating a mechanical device having an optical encoding apparatus, wherein the optical encoding apparatus includes a codescale, an encoder housing and a light-detecting sensor, wherein the light-detecting sensor contains a two-dimensional array of light detecting elements having at least 4-by-4 elements is presented. Such method includes a step of compensating for an alignment error based on movement detected by the light-detecting sensor.

DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

Optical encoders are generally classified into two categories: transmission-based optical encoders and reflection-based optical encoders. The following disclosure is generally directed to reflection-based optical encoders. However, it should be appreciated that there will be pertinent concepts that may readily apply to transmission-based encoders as well.

Figure 1:
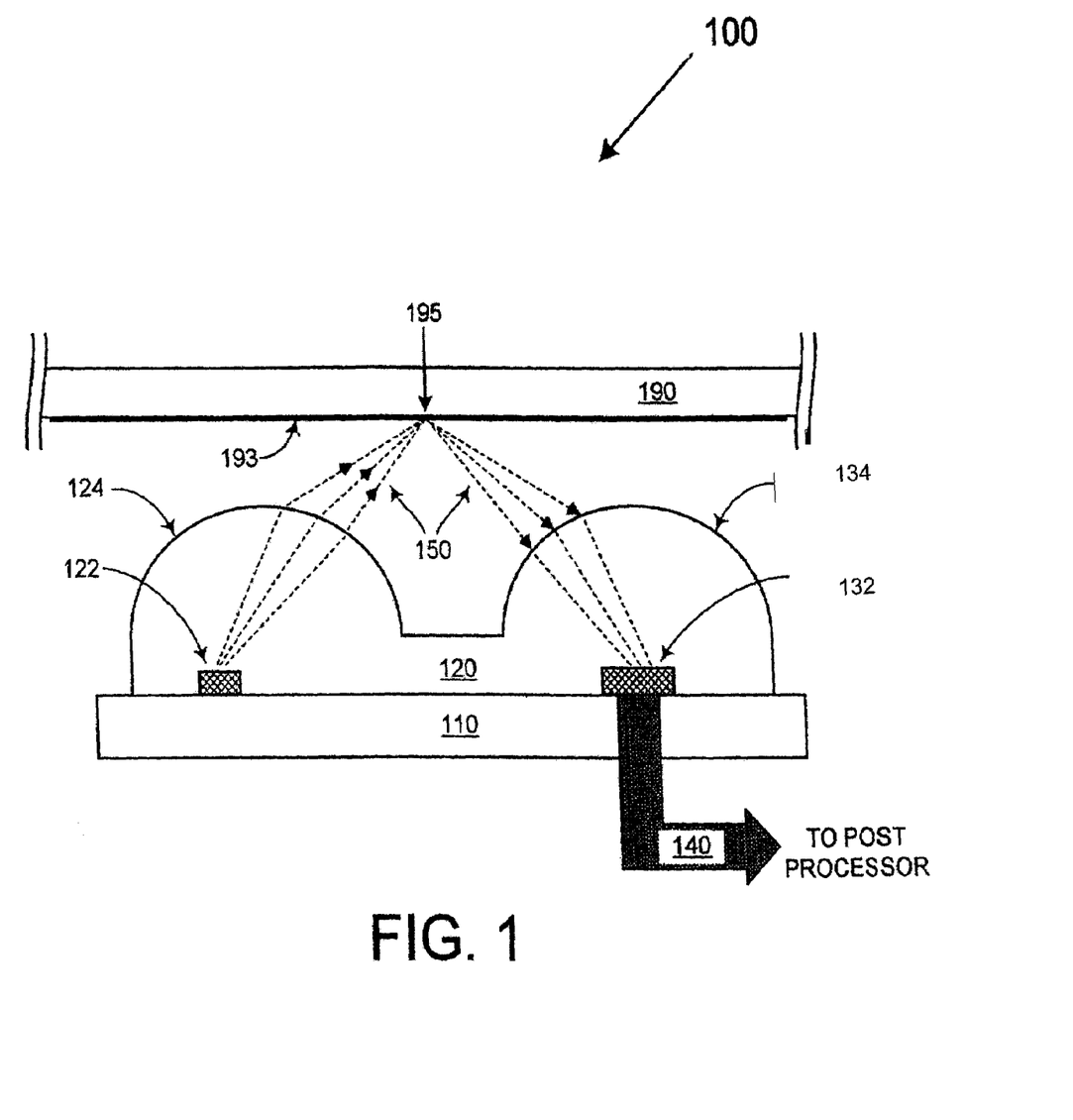
FIG. 1 shows a reflection-based optical encoder for use with the disclosed methods and systems.

FIG. 1 shows a first reflection-based optical encoder 100. The reflection-based encoder 300 includes an optical emitter 122 and an optical detector 132 mounted on a substrate 110 and encapsulated in an optical housing 120, which is typically made from some form of resin or glass. The exemplary optical housing 120 has two dome-shaped lenses 124 and 134, with the first lens 124 directly above the optical emitter 122 and the second lens 134 directly above the optical detector 132. A codescale 193, i.e., a codewheel, codestrip or the like, is positioned above the housing 120 on body 190, which for the present example can be a flat, linearly moving body or spinning disk. A link 140 is provided from the detector 134 to a post processor (not shown) in order that light signals reaching the detector 134 can be properly interpreted.

In operation, light emitted by the optical emitter 122 can be focused by the first lens 124, then transmitted to the codescale 193 at location 195. Should the codescale 193 be positioned such that a reflective slot/bar is present along the path 150 of the transmitted light, the transmitted light can be reflected to the second lens 134, then focused by the second lens 134 onto the optical detector 132 where it can be detected. Should the codescale 193 be positioned such that a reflective slot/bar is present along the path 150 of the transmitted light, the transmitted light will be effectively blocked, and the optical detector 132 can detect the absence of light. Should the codescale 193 be configured such that a combination of reflective and non-reflective bars are simultaneously present at location 195, the codescale 193 can reflect light commensurate with the pattern of reflective and non-reflective bars such that the pattern is effectively projected onto the optical detector 132.

Generally, it should be appreciated that the installation of an optical encoder can be a precise and time-consuming task. For example, a typical optical encoder must be installed with a high precision of alignment, and the failure to do so can cause the optical encoder to effectively malfunction. Accordingly, there can be a substantial cost in manufacturing associated with the installation of a precision optical encoder.

Figure 2:
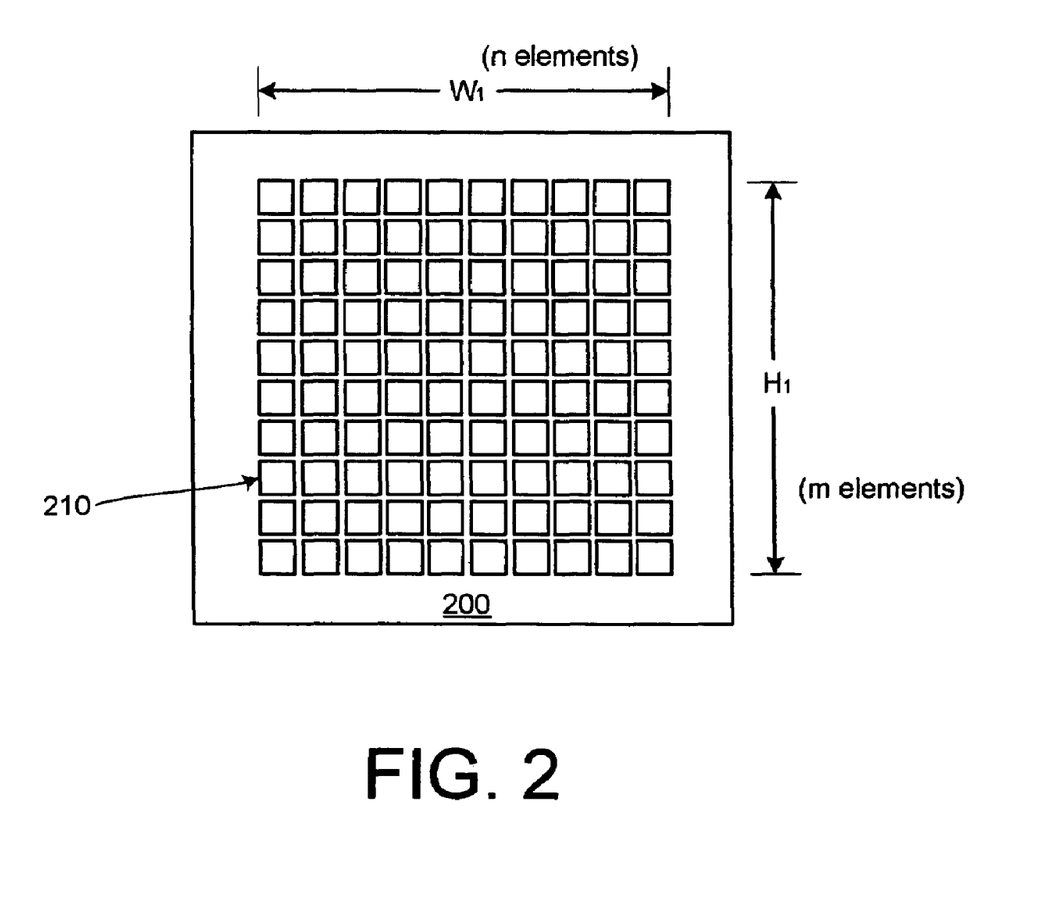
FIG. 2 shows an exemplary detector for use with the disclosed methods and systems.

In order to overcome this problem, the inventors of the disclosed methods and systems have developed a highly flexible light-sensing detector that not only solves most alignment issues, but provides a host of other advantages as well. FIG. 2 depicts an exemplary light-sensing detector 200 for use with the disclosed methods and systems. As shown in FIG. 2, the light-sensing detector 200 includes and array of light-detecting elements 210 with each light-detecting element 210 independently capable of sensing light, converting the sensed light to an electrical quantity (e.g., current, voltage or resistance) and conveying that electrical quality to an external device, such as a digital signal processor/controller having an analog-to-digital converter. While the exemplary light-sensing detector 200 includes a 10-by-10 array of light-detecting elements 210, it should be appreciated that the size of such an array can vary to as little as a 2-by-2 array (or more practically 4-by-4 array), or alternatively can exceed more than 100-by-100 elements depending on the particular circumstances of use. Further, the overall dimensions ($W_1$-by-$H_1$) of the array of light-detecting element 210 can also vary as desired or otherwise required by the particular circumstances of use.

As will be shown below, the light-sensing detector 200 of FIG. 2 can not only be used to alleviate alignment errors, but also has a number of other important advantages.

For example, the light-sensing detector 200 can be used to sense movement in two-dimensions, as opposed to movement in a single dimension as other optical encoders are limited. Further, the light-sensing detector 200 can be used to detect eccentric motion to practically any angle with a sufficient level of precision as to ensure accurate and reliable operation of an optical encoder. Still further, the light-sensing detector 200 can be used to detect a rotation of a codescale with respect to an encoder body.

Still further, the light-sensing detector 200 can be used to detect specific shapes that may be present on a particular codescale. For example, a particular codestrip may consist of alternating rectangular bars and windows across its length, but otherwise incorporate one or more unique patterns, e.g., a square, a star, a circle or the like, to signify location data, such as a center or location reference. Such shape information can also enable a processor to determine a particular model number or model revision as such information may be incorporated, for example, as a particular window shape, as a barcode or even as a series of alpha-numeric characters written on the codescale.

Figure 3A:
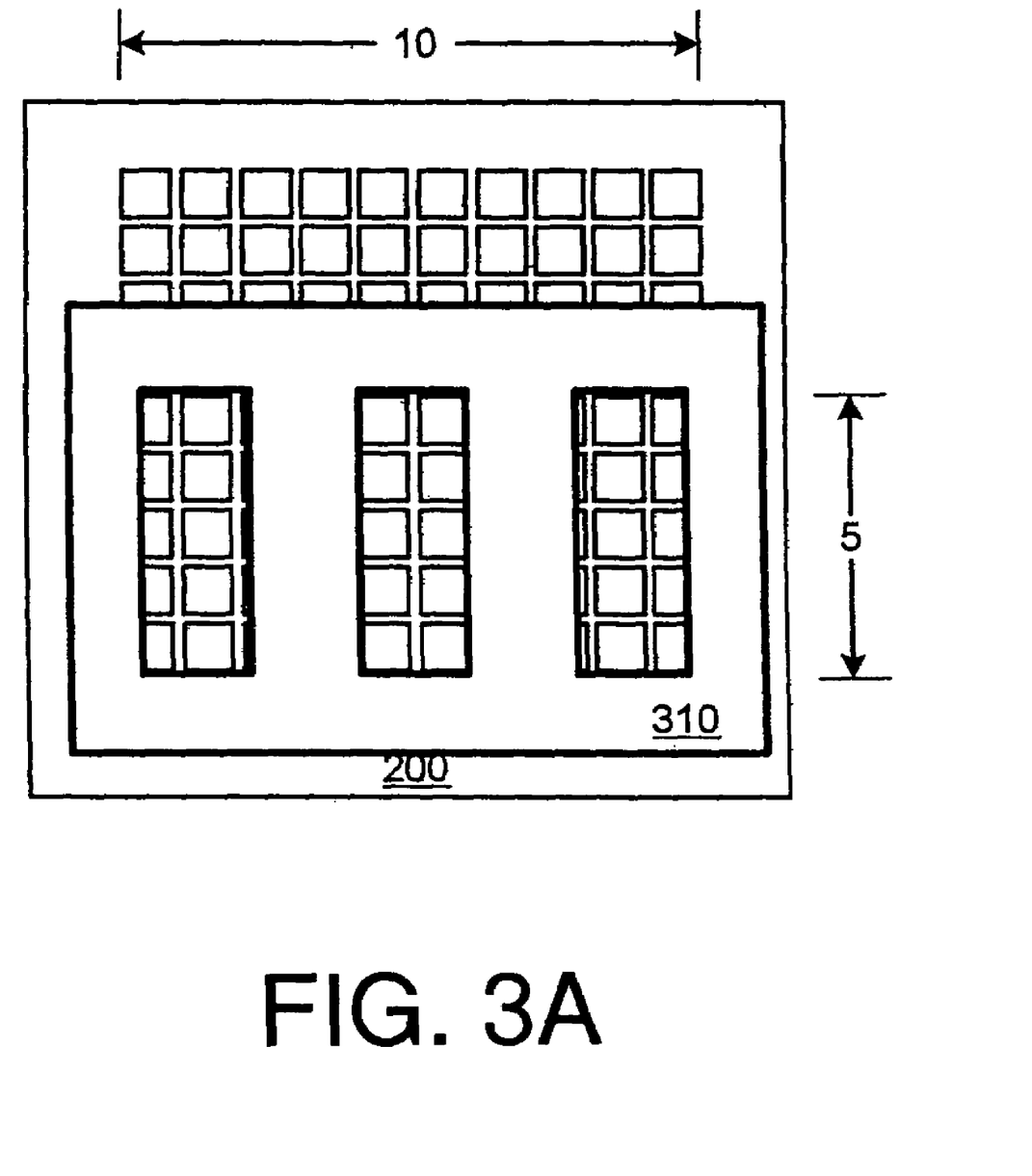
FIG. 3A shows the exemplary detector of FIG. 2 with a first projected codescale pattern superimposed.

FIG. 3A depicts the detector 200 of FIG. 2 with a codescale projection 310 superimposed over the detector 200. The particular codescale for the exemplary system is configured to move in a left-right direction with respect to the detector 210, and as can be deduced by the configuration of FIG. 3A only a limited number of light-detection elements (i.e., a 5-by-10 sub-array) will be affected by the codescale's movement.

Figure 3B:
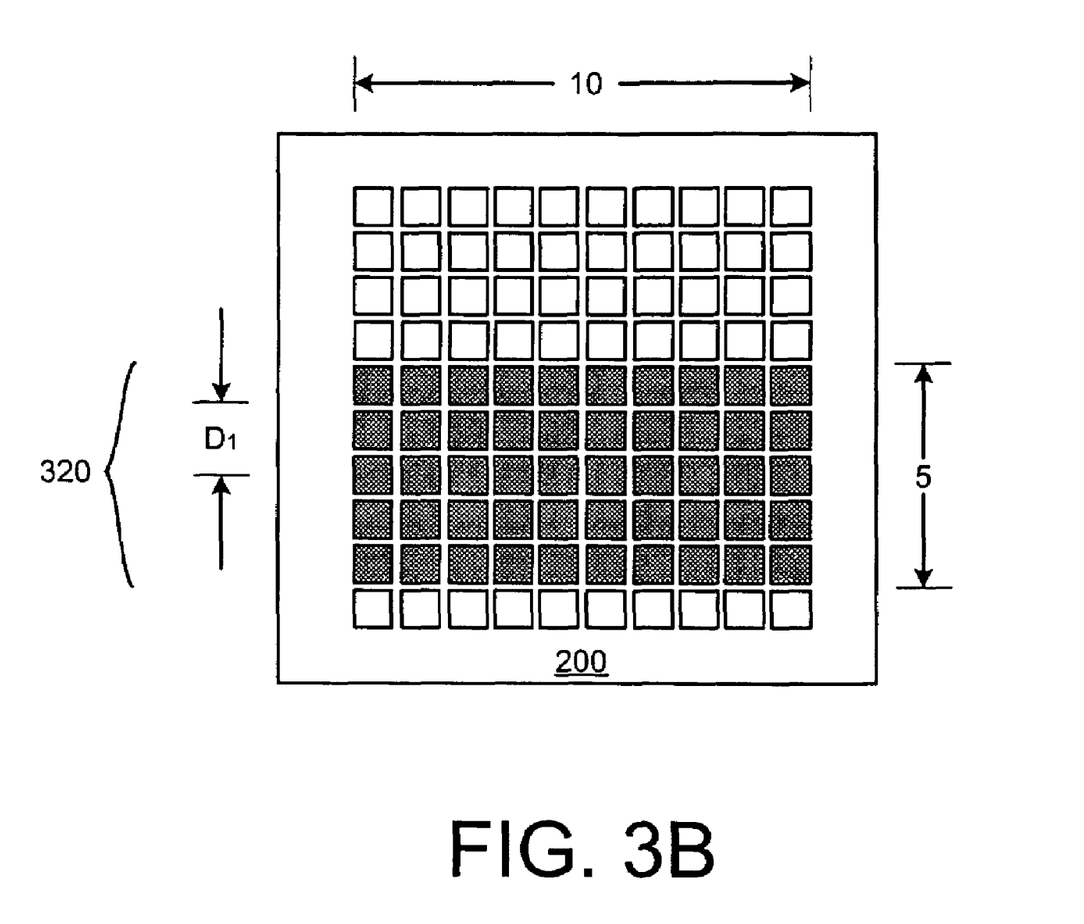
FIG. 3B shows the affected detection elements for the example of FIG. 3A.

FIG. 3B more clearly shows the affected light-detection elements 320 (shown as shaded), and further indicates that the codescale 310 of FIG. 3A is offset by a linear distance of $D_1$, a distance that can be discerned by a processor monitoring the detector 200. Given that only a select number of light-detection elements 320 are affected, it should be appreciated that a processor monitoring the detector 200 does not need to monitor every detection element. To the contrary, as only fifty of the one-hundred detection elements are affected by the codescale's motion, a processor monitoring the codescale's motion can eliminate much needless processing by only monitoring the fifty affected detection elements 320 with no degradation of performance.

Figure 3C:
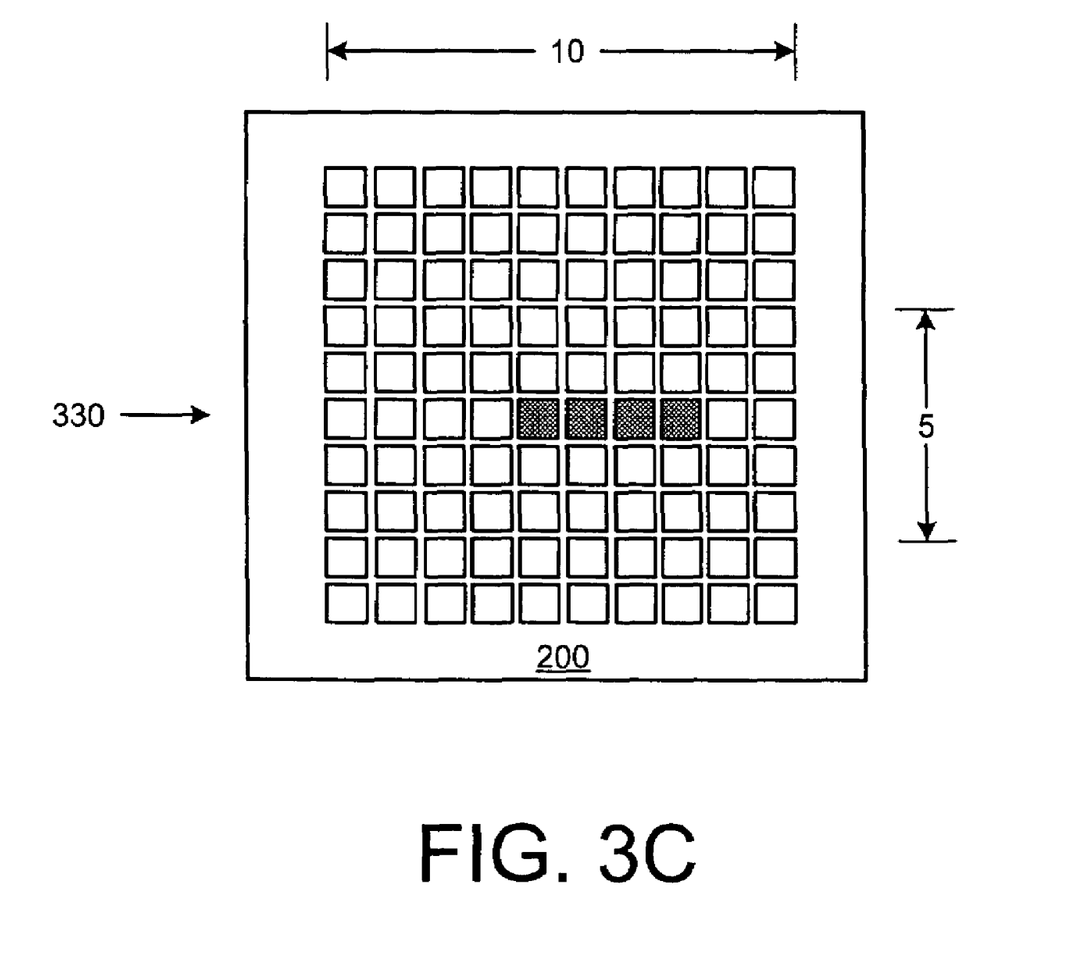
FIG. 3C shows an exemplary subset of the affected detection elements for the example of FIG. 3A for use in detecting both motion and direction of the related codescale.

Moving to FIG. 3C, it should be appreciated that not all of the affected fifty detection elements 320 may be necessary to monitor codescale motion. Accordingly, FIG. 3C depicts an exemplary minimal subset of detection elements 330 (shown as shaded) useful to monitor codescale movement and direction. While only four detection elements 330 are used for the example of FIG. 3C, it should be appreciated that more detection elements can be used to incorporate redundancy, higher reliability or some other desirable feature. It should also be appreciated that the chosen detection elements need not be contiguous, but can be spread about any useful pattern among the fifty affected detection elements 320. Still further, while in some embodiments the number and pattern of used detection elements may be chosen based on a minimum number of detection elements needed to perm necessary operations, other criteria may be applied including criteria related to the optimization of processing, reliability and functionality.

Figure 4A:
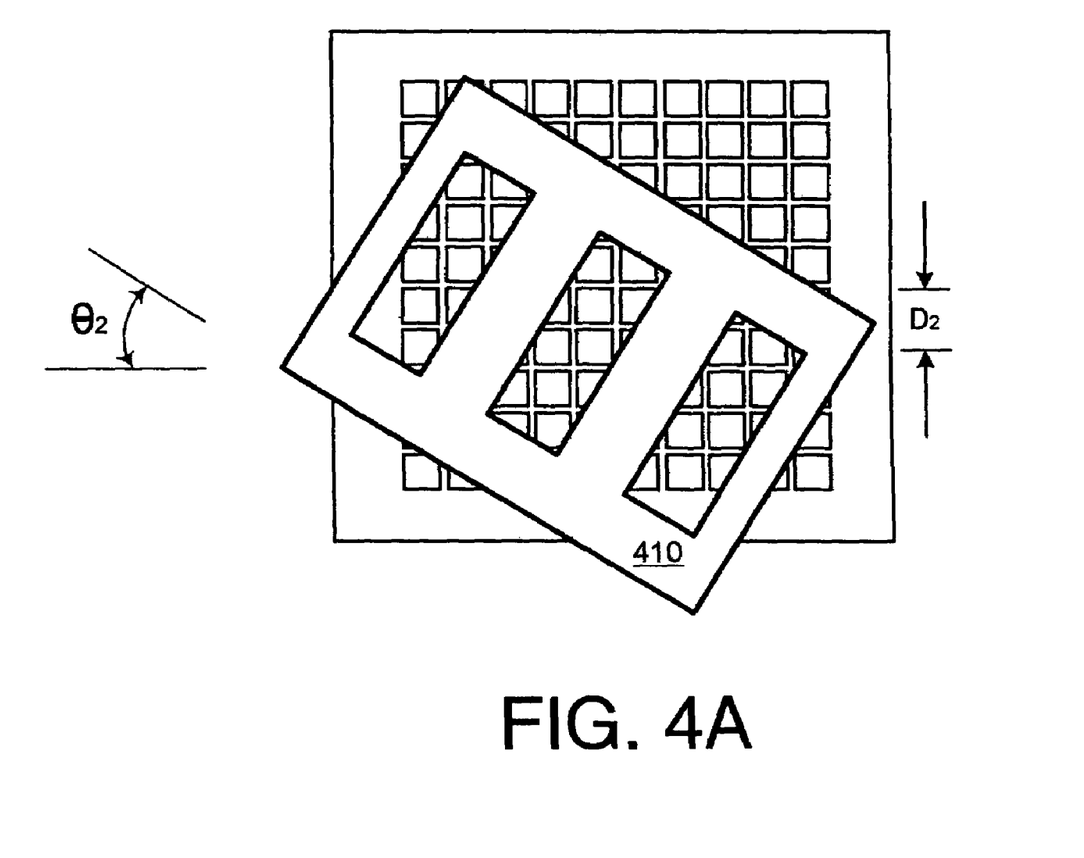
FIG. 4A shows the exemplary detector of FIG. 2 with a second projected codescale pattern superimposed.

FIG. 4A depicts the detector 200 of FIG. 2 with a second codescale projection 410 superimposed over the detector 200. The particular codescale for the exemplary system is configured to move in an eccentric direction with respect to the detector 210 (and the related encoder body), and as can be deduced by the configuration of FIG. 4A only a limited number of light-detection elements will be affected by the codescale's movement.

Figure 4B:
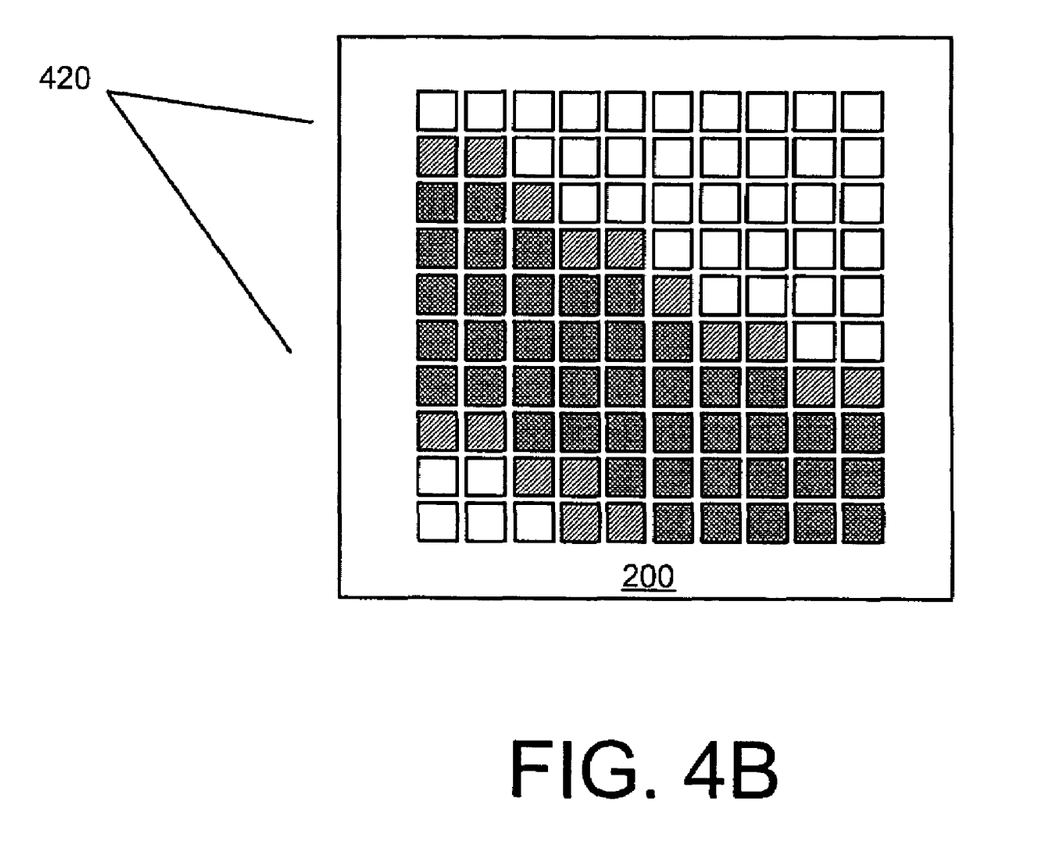
FIG. 4B shows the affected detection elements for the example of FIG. 4A.

FIG. 4B depicts more clearly the affected light-detection elements 420 of FIG. 4A. Those light-detection elements that are fully affected (i.e., are subjected to complete exposure and complete shading) are heavily shaded, and those light-detection elements that are partially affected are shown as lightly shaded. The codescale 410 of FIG. 4A is offset by a linear distance of $D_2$ and an angular offset of $\theta_2$, both quantities of which can be discerned by a processor monitoring the detector 200.

Figure 4C:
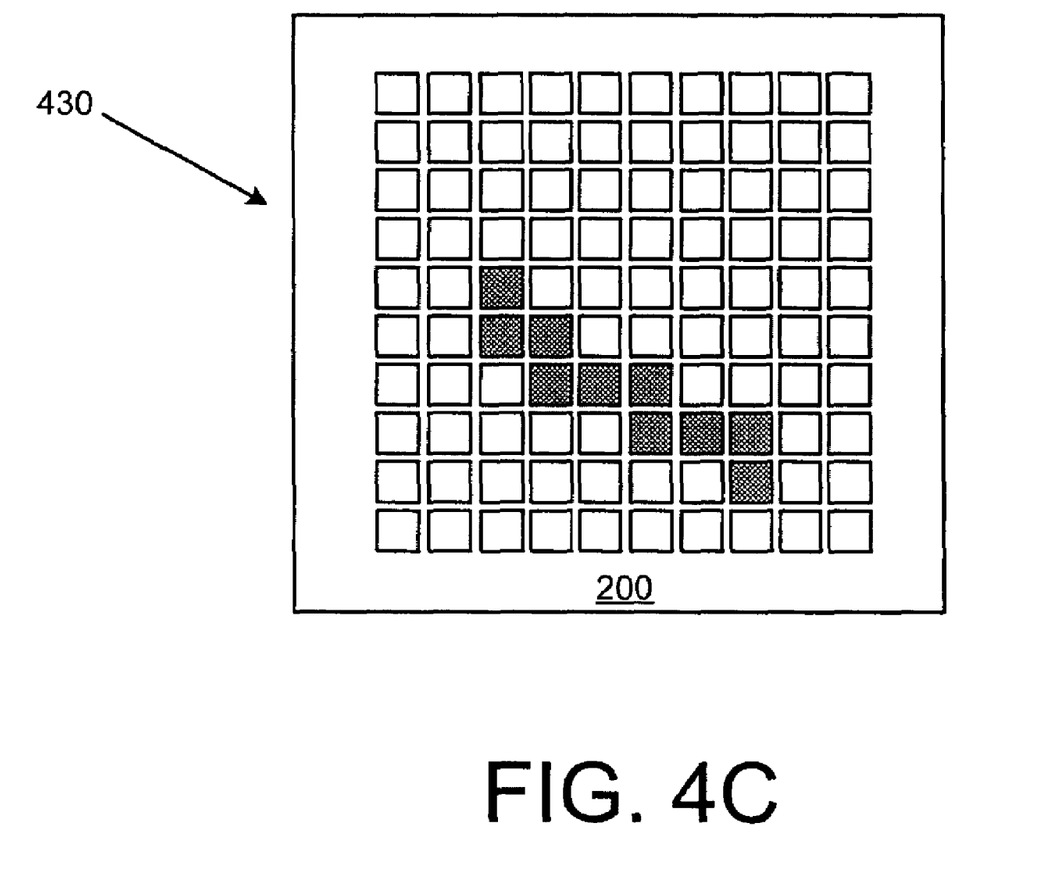
FIG. 4C shows an exemplary subset of the affected detection elements for the example of FIG. 4A for use in detecting both motion and direction of the related codescale.

Again as with the previous example, given that only a select number of light-detection elements 420 are affected, it should be appreciated that a processor monitoring the detector 200 does not need to monitor every detection element. Further, as shown with FIG. 4C, it should be appreciated that not all of the affected detection elements 420 may be necessary to monitor codescale motion, but a subset of detection elements 430 (shown as shaded) useful to monitor codescale movement and direction can be chosen based on any number of functional criteria, such as processing, redundancy, reliability and so on.

While FIGS. 3A and 4A are directed to single-direction codescale motion, it should be appreciated that by changing the codescale to incorporate a two-dimensional array of windows, the detector 200 (with supporting processor) of FIG. 2 can be used to sense motion and direction along two dimensions by monitoring the relative motion of windows superimposed over detector 200 with the caveat that all the detection elements 210 will likely be affected during operation.

Additionally, with FIGS. 3A and 4A in mind, it should be appreciated that a rotation of a codescale can be detected assuming that the relative resolution of the detection elements 210 is large enough to detect the relative shapes of individual codescale windows. That is, given that the instantaneous number and pattern of detection elements will change as a codescale rotates from an angle of θ=0 (FIG. 3A) to an angle of θ=θ$_2$ (FIG. 4A), angular information can be derived from the detector 200 with the appropriate post-processing.

Figure 5:
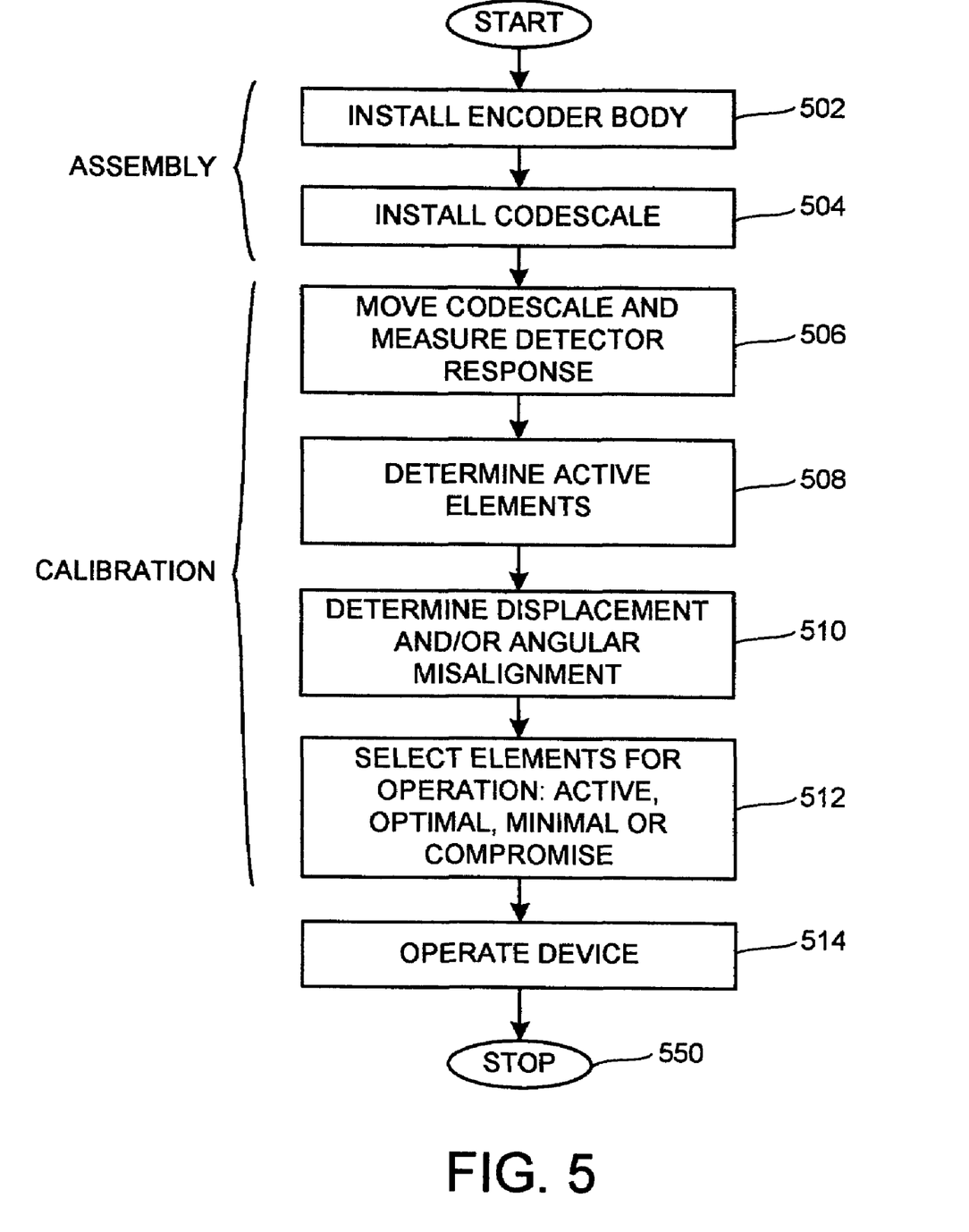
FIG. 5 is a flowchart outlining an exemplary process according to the present disclosure.

FIG. 5 is a flowchart outlining an exemplary operation for calibrating and using optical encoders, such as the optical encoder with assorted components described above. The process starts at step 502 where the encoder body is installed on a particular device for use, such as a printer head or printer drum. Next, in step 504 the related codescale, e.g., codestrip or codewheel, is also installed. Control continues to step 506.

In step 506, the codescale is moved relative to the encoder body in order to determine the response of individual detection element of a detector in the encoder body. The exemplary detector can be an n-by-m array device, such as the 10-by-10 array shown in FIGS. 2-4C. However, as discussed above, the size, shape and resolution of the detector can change from embodiment to embodiment as may be found useful or advantageous. Next, in step 508, the number of detection elements affected by the actions of step 506 are determined. Control continues to step 510.

In step 510, a number of other useful properties can be determined based on the actions of step 506 including: linear misalignment, angular misalignment, relative angular motion of the codescale to the encoder body, model number/revision number of the codescale and/or the device using the codescale, the shape of the codescale's windows, shape of the codescale's bars, the nature of the codescale's movement (e.g., one-dimensional, two dimensional, eccentric) and so on. Control continues to step 512.

In step 512, an appropriate set of detection elements in the detector is selected for use. In various embodiments, such a set can be the total number of detection elements affected by use (including or excluding partially affected detection elements) or some subset based on minimization of processing criteria, optimal performance criteria, redundancy/reliability criteria, a compromise of various criteria or some other useful criteria. Control continues to step 514.

In step 514 the device incorporating the codescale and encoder body of steps 502 and 504 is operated to detect any of one-dimensional movement, two-dimensional movement, eccentric movement, rotation and so on. Such operation continues as long as necessary or desired, and control continues to step 550 where the process stops.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. An optical encoding apparatus for the detection of position and/or motion of a mechanical device, the apparatus comprising:
   a codescale;
   an encoder housing having one or more portions;
   a light-detecting sensor embedded within the encoder housing; and
   a processing device linked to the light-detecting sensor and configured to determine an amount of light received by each light-detection element, the processing device being configured to determine at least one of a linear offset and an angular offset of the codescale with respect to the encoder housing based on signals received from the light-detecting sensor, wherein the light-detecting sensor is capable of sensing a pattern produced by the codescale superimposed on the light-detecting sensor, and wherein the light-detecting sensor includes a two-dimensional array of light detection elements having dimensions n-by-m where n and m are both integers greater than 4, a vertical dimension of the two-dimensional array of light detection elements being longer than a corresponding vertical dimension of the pattern produced by the codescale so that some of the light detection elements along the vertical dimension of the two-dimensional array are not affected by the pattern on the light-detecting sensor when the codescale is displaced with respect to the encoder housing, the vertical dimension being the dimension along a direction orthogonal to the moving direction of the codescale relative to the encoder housing.

2. The optical encoding apparatus of claim 1, wherein the processing device is configured to determine two-dimensional motion of the codescale with respect to the encoder housing based on signals received from the light-detecting sensor.

3. The optical encoding apparatus of claim 1, wherein the processing device is configured to detect at least two different window shapes or two different bar shapes based on signals received from the light-detecting sensor.

4. The optical encoding apparatus of claim 1, wherein the processing device is configured to detect a rotation of the codescale relative to the encoder housing.

5. The optical encoding apparatus of claim 1, wherein the processing device is configured to determine an affected set of light-detection elements of the light-detecting sensor that change state as the codescale changes position with respect to the encoder housing , wherein the affected set of light-detection elements is a subset of the total number of light-detection elements of the light-detecting sensor.

6. The optical encoding apparatus of claim 5, wherein the processing device is further configured to detect at least a change of position of the codescale with respect to the encoder housing based on each element of the affected set of detection elements.

7. The optical encoding apparatus of claim 6, wherein the processing device is further configured to detect at least a change of position of the codescale with respect to the encoder housing based on a subset of elements of the affected set of detection elements.

8. The optical encoding apparatus of claim 6, wherein the processing device is further configured to detect at least a change of position of the codescale with respect to the encoder housing based on a least possible number of elements of the of light-detection elements set of detection elements.

9. The optical encoding apparatus of claim 6, wherein the processing device is further configured to compensate for a misalignment of the codescale with respect to the encoder housing using at least a plurality of detection elements within the affected set of detection elements.

10. The optical encoding apparatus of claim 1, wherein each detection element is equal to or less than one-half a width of a projected window of the codescale.

11. An optical encoding apparatus for the detection of position and/or motion of a mechanical device, the apparatus comprising:
- a codescale;
- an encoder housing having one or more portions;
- a processing means; and
- a light-detecting means embedded within the encoder housing for sensing a two-dimensional pattern produced by the codescale, wherein the light-detecting means and the processing means are configured to detect eccentric motion of the codescale relative to the encoder housing,
wherein the light-detecting means includes a two-dimensional array of light detection elements having dimensions n-by-m where n and m are both integers greater than 4, a vertical dimension of the two-dimensional array of light detection elements being longer than a corresponding vertical dimension of the pattern produced by the codescale so that some of the light detection elements along the vertical dimension of the two-dimensional array are not affected by the pattern produced by the codescale when the codescale is displaced with respect to the encoder housing, the vertical dimension being the dimension along a direction orthogonal to the displacement direction of the codescale relative to the encoder housing.

12. The optical encoding apparatus of claim 11, wherein the processing means linked to the light-detecting means for compensating for an alignment error of the codescale with respect to the encoder housing and for determining a movement of the codescale with respect to the encoder housing.

13. The optical encoding apparatus of claim 12, wherein the light-detecting means and processing means can also detect at least one of: a misalignment of the codescale relative to the encoder housing, two-dimensional motion of the codescale relative to the encoder housing and rotation of the codescale relative to the encoder housing.

14. A method for calibrating a mechanical device having an optical encoding apparatus, the optical encoding apparatus comprises a codescale, an encoder housing, a light-detecting sensor embedded in the housing, and a processing device linked to the light-detecting sensor and configured to determine an amount of light received by each light-detection element, the processing device being configured to determine at least one of a linear offset and an angular offset of the codescale with respect to the encoder housing based on signals received from the light-detecting sensor, the light-detecting sensor contains a two-dimensional array of light detecting elements having at least 4-by-4elements, a vertical dimension of the two-dimensional array of light detection elements being longer than a corresponding vertical dimension of a pattern produced by the codescale superimposed on the light-detecting sensor so that some of the light detection elements along the vertical dimension of the two-dimensional array are not affected by the pattern on the light-detecting sensor when the codescale is displaced with respect to the encoder housing, the vertical dimension being the dimension along a direction orthogonal to the displacement direction of the codescale relative to the encoder housing, the method comprising compensating for an alignment error based on movement detected by the light-detecting sensor.

15. The method of claim 14, wherein compensating for an alignment error includes a first step of moving the codescale relative to the encoder housing and determining a first set of light-detecting elements of the light-detecting sensor affected by the movement.

16. The method of claim 15, wherein compensating for an alignment error includes choosing a second set of light-detecting elements useful for determining codescale movement relative to the encoder housing, wherein each element of the second set of light-detecting elements can be found in the first set of light-detecting elements.

17. The method of claim 15, wherein the step of compensating for an alignment error includes compensating for an angular alignment error.

18. The method of claim 15, wherein the step of compensating for an alignment error includes compensating for a linear offset error.

* * * * *